United States Patent [19]

Watanabe

[11] 4,362,710

[45] Dec. 7, 1982

[54] FEEDS FOR BABY PIGS, PROCESS FOR PREPARING THE SAME AND METHOD OF BREEDING BABY PIGS

[75] Inventor: Yoshiko Watanabe, Yokohama, Japan

[73] Assignee: Nissan Gosei Kogyo Co., Ltd., Tokyo, Japan

[21] Appl. No.: 277,975

[22] Filed: Jun. 26, 1981

[30] Foreign Application Priority Data

Jul. 4, 1980 [JP] Japan .............................. 55-94461[U]
Dec. 2, 1980 [JP] Japan ................................. 55-169855

[51] Int. Cl.³ ..................... A61K 9/20; A61K 31/295; A61K 33/26
[52] U.S. Cl. ...................................... 424/14; 424/147; 424/295; 426/2; 426/74; 426/806
[58] Field of Search ................ 426/274, 806; 424/147, 424/14, 295

[56] References Cited

U.S. PATENT DOCUMENTS

| | | | |
|---|---|---|---|
| 2,512,537 | 6/1950 | Zellers | 426/74 |
| 2,558,092 | 8/1951 | Kelly et al. | 426/516 |
| 2,786,760 | 3/1957 | Bonnafoux | 426/516 |
| 3,259,500 | 7/1966 | Barnhart et al. | 424/147 |
| 3,332,778 | 7/1967 | Wickening | 424/295 |
| 3,428,457 | 2/1969 | Hutchinson | 424/295 |
| 3,868,467 | 2/1975 | Olson | 426/2 |
| 3,975,513 | 8/1976 | Hecht et al. | 424/147 |
| 4,001,452 | 6/1977 | Williams | 426/516 |
| 4,171,379 | 10/1979 | Harmon et al. | 424/147 |
| 4,182,755 | 6/1980 | McNeff | 424/147 |
| 4,183,947 | 1/1980 | Cockerill | 424/295 |

FOREIGN PATENT DOCUMENTS

| | | | |
|---|---|---|---|
| 764070 | 10/1971 | Belgium | 424/147 |
| 2111656 | 9/1972 | Fed. Rep. of Germany | 426/74 |
| 2129355 | 9/1972 | Fed. Rep. of Germany | 424/147 |
| 51-76437 | 2/1976 | Japan | 424/147 |
| 53-38629 | 8/1978 | Japan | 424/295 |
| 382480 | 10/1932 | United Kingdom | 426/516 |

*Primary Examiner*—Shep K. Rose

[57] ABSTRACT

The feed to be fed to baby pigs is composed of at least one kind of edible iron salt in an amount corresponding to 3.2 to 16.4% by weight as iron; at least one kind of edible organic acid or a salt thereof in an amount of 1 to 10% by weight, which is in solid form at room temperature; small amounts of a sweetener, a flavoring and, if desired, vitamins; and a base containing an oligosaccharide as the balance. This feed is in the form of pellets.

12 Claims, No Drawings

FEEDS FOR BABY PIGS, PROCESS FOR PREPARING THE SAME AND METHOD OF BREEDING BABY PIGS

BACKGROUND OF THE INVENTION

I. Field of the Invention

The present invention relates to an iron preparation having a high iron concentration, which is superior in taste and which baby pigs up to 15 days old can ingest easily for nourishment as a feed for baby pigs of the suckling stage; and to a process for preparing such an iron preparation as well as to a method of breeding baby pigs.

II. Description of the Prior Art

Although present in animals in the spleen, liver, kidney and the like, iron is present primarily in hemoglobins and plays an important role in transporting oxygen and carbon dioxide. It is also a constituent of porphyrin proteins, e.g., hemoglobin, myoglobin, cytochrome, catalase, peroxidase and the like and enters into the respiration process.

Generally, baby pigs fall into a state of anemia as their erythrocytes decrease after about the third day after birth. If this state is allowed to continue, the rate of breeding and immunity against disease decrease, whereby the baby pigs become susceptible to disease and death.

This occurs because baby pigs have very small amounts of iron in their tissues at the time of birth, the milk of sows also contains only a small amount of iron, and the hematogenous functions cannot keep up with the very fast growth of the baby pig.

Although at the time of birth the body of a baby pig contains about 15 mg of stored iron which is available for immediate utilization, it consumes about 7 mg of iron every day for making blood. Sow's milk which is the replenishment source of iron contains about 2 mg of iron per liter; however, baby pigs consume only about 500 to 600 ml per day, so that the amount of iron which can be replenished by the sow's milk is no more than about 1 mg per day. Accordingly, as the amount of iron the baby pig requires cannot be completely replenished by the sow's milk, the baby pig depletes its store of iron in three days after birth, causing certain nutritive anemia. In this case, even if large doses of iron supplement were given to the sow, the iron is little tranferred to the sow's milk and no replenishing effect for the baby pigs is achieved.

As a measure of preventing anemia, baby pigs are usually injected with iron preparations in two periods; between the 3rd and 7th day, and between the 10th day and the 14th day after birth. The injection, however, involves the following problems:

1. The operation is laborious because injections must be administered to each individual baby pig.
2. Trauma to the baby pigs may be so great as to hinder their growth.
3. There is possibility of fatal poisoning of the baby pigs.
4. Fevers or tumors may be caused, and degeneration of muscles at the injection site may cripple the animal.
5. If iron is not absorbed in the muscle and remains unabsorbed at the injection site, it may cause discoloration and reduce the quality of the meat.

The absorption of iron through the wall of the intestinal tract is affected by the amount of iron in the body. When the amount of iron is small, the absorption is automatically accelerated. When the amount of iron is sufficient, the absorption of iron is suppressed. Accordingly, where an iron preparation is administered orally, the control function of the absorption of iron in the intestinal tract prevents overabsorption of iron, which protects against poisoning.

Although iron can be absorbed anywhere in the stomach and intestines, it is absorbed mostly through the duodenum. The iron which is absorbed in the intestinal tract is in divalent form. It is considered that, although the iron in feed and organic iron bound loosely to an organic acid is in trivalent form, it is absorbed after reduction to the divalent form by the influence of gastric juices.

It is accordingly ideal that the replenishment of iron in anemic baby pigs be effected through oral administration of iron-supplemented feeds, feed additives or vitamin compositions, and that the iron be absorbed in a natural condition through feed ingestion.

Heretofore, attempts have been made to develop iron-containing feeds or oral preparations for baby pigs of the suckling stage, which have been prepared by admixing iron preparations with a base, such as saccharides, grains, rice bran, wheat bran and the like, and forming the admixture into blocks, fine granules or powders. These attemts, however, have proved fruitless because baby pigs refused to ingest these oral preparations. As iron preparations which are currently available as feed additives, iron sulfate, ferrous fumarate, sodium iron succinate citrate and iron DL-threonine were approved on Sept. 15, 1978, and iron citrate was approved on Nov. 19, 1979, in Japan.

SUMMARY OF THE INVENTION

The iron preparations for oral administration have heretofore failed and the injection procedures which have various drawbacks are still carried out because the flavor of iron is not suited to the taste of baby pigs and baby pigs up to the 15th day after birth have only suckling behavior. The astringent or so-called "metallic taste" of iron is generally disliked and considered irritating.

From the point of view that it may be possible to have baby pigs up to 15th day after birth take in these iron salts naturally and without forced ingestion and that, if ingested, the iron absorbed can replenish the lack in the iron content in the bodies to a sufficient extent, the inventors have carried out their research to ensure a labor-saving procedure for replenishing iron. This research has now led to the present invention.

Therefore, the object of the present invention is to provide a feed capable of replenishing iron required by baby pigs within the 15th day after birth, which can be ingested orally in a natural condition and without forced administration, and a process for preparing such a feed.

Another object of the present invention is to raise and breed baby pigs within the 15th day after birth.

The feed for baby pigs to be fed for replenishment of iron in accordance with the present invention comprise an edible iron salt in an amount equivalent of 3.2 to 16.4% by weight of iron, an edible organic acid or a salt thereof in an amount of 1 to 10% by weight, small amounts of sweeteners, flavors and, if desired, vitamins, and an oligosaccharide-containing base as the balance. The feed is formed into pellets.

The feeds in accordance with the present invention can replenish iron required by baby pigs within the 15 day after birth. With these feeds, the baby pigs can be raised with a favorable rate of breeding and a high immunity against disease.

The term "baby pig" referred to in the specification and the appended claims refers to baby pigs up to 15 to 20 days old, unless otherwise noted.

DETAILED DESCRIPTION OF THE PREFERRED EMBODIMENTS

As stated hereinabove, the feeds for baby pigs in accordance with the present invention contain an edible iron salt for replenishment of iron.

As iron salts, there may be employed a variety of iron salts which are generally available, such as iron sulfate, sodium iron succinate citrate, iron Dl-threonine, iron citrate, ferrous fumarate and the like. With problems with absorption and toxicity taken into consideration, iron salts of an organic acid are preferred with ferrous fumarate being particularly suitable.

It has already been stated that the amount of iron required by a baby pig is about 7 mg per day. Supposing that each baby pig uses 10 mg of iron per day, the actual intake of iron should be in the amount of about 25 mg (equivalent of about 76 mg as ferrous fumarate) because it is assumed that the iron is absorbed at a rate of about 40% when it is administered orally.

The amount of the sow's milk which a baby pig can suckle at one suckling is about 15 to 20 ml, and a baby pig suckles about 20 to 25 times per day so that the total amount becomes about 500 to 600 ml. It is also to be noted that the amount of solids which a baby pig can additionally ingest is restricted accordingly. Observations by the inventors during their experiments show that, although it varies with the form of the feed, the amount of solid feed which a baby pig up to the 3rd day after birth can ingest in addition to the milk it suckles is at most 750 mg per day. Thus, the total amount of iron required by the baby pig daily for replenishment should be contained in that amount of feed.

Accordingly, the preferred iron content in feed products should be in the range of 3.3% to 16.5% as an iron salt. For example, ferrous fumarate has an iron content in the amount of 32.87% so that the content of ferrous fumarate in the feed product corresponds to 10 to 50% by weight. Where the iron content is below this value, the iron cannot be adequately be replenished and no effect of preventing anemia can be recognized. Where the iron content is above the range, the iron taste cannot be avoided by any of the improvements in taste effected under the conditions of the present invention.

Where iron salts are contained in such large amounts, it is impossible to get rid of the astringent (a rought taste) and a taste of iron (a metallic taste) peculiar to iron salts even if they are diluted with bases containing oligosaccharides such as lactose. For this reason, baby pigs do not ingest such feed.

Various attempts have been made to improve the metallic and astringent taste originating with the iron itself by admixing the iron with various materials. Selection of materials superior in taste has been made by carrying out comparative taste tests which involve simultaneously placing two kinds of specimens on a rubber feeding dish (oval form; length, 23 cm; width, 12 cm; height 2 cm) and determining the first to have been ingested as superior in taste in a tournament system.

As a result, it has been found that the taste is improved by admixing the iron salt with a sour organic acid or a salt thereof when lactose is used as a base for the feed product. Such organic acids may include, for example, citric acid, succinic acid, gluconic acid, malic acid, fumaric acid and the like. Such salts may include, for example, sodium salt, potassium salt, calcium salt and the like. Among these compounds, citric acid is most preferred. The most suitable rate for admising the organic acid is in the range from 10 to 20% by weight with respect to the content of the iron salt. The amount of the organic acid or the salt thereof may usually correspond to 1 to 10% by weight with respect to the feed product. The balance of the product in % by weight from the iron salt and the organic acid comprises the base containing oligosaccharides, such as lactose.

Another important discovery is that, although a mere compounding of ferrous fumarate, citric acid and lactose in appropriate amounts has the effect of improving taste (but not to an extent sufficient in practical use), a remarkable improvement in taste can be achieved by milling the mixture as hereinabove stated under elevated pressure and extruding the resulting mixture into pellets. Comparative taste tests were carried out on a mixture of, for example, 40 parts of ferrous fumarate, 5 parts of citric acid, 10 parts of α-starch (adhesive) and 45 parts of lactose. The taste tests on pellets obtained from the mixture by means of a high pressure pelletizing extruder with a screw have clearly shown that baby pigs will take in only the pellets.

As a result of further studies, it has been found that heating at the time of extrusion molding under high pressure in the range of 20 to 70 kg/cm$^2$ is an extremely effective process. In this case, it has also been found that the presence of water in large amounts turns the product remarkably dark and impaires the taste. Accordingly, although it is preferred to carry out the extrusion molding as a molding procedure under high pressure because the heating and the molding can be done simultaneously, a similar effect of improving the taste can also be attained with a procedure which involves previously heating the mixture, spraying the heated mixture with an extremely small amount of an adhesive solution, and allowing particles to coagulate by themselves through self granulation such as a rolling granulation or fluidized bed granulation without application of pressure. The heating temperature at this time is suitably at least 70° C., preferably in the range of 100° to 110° C. As a high water content is not preferred as hereinabove mentioned and as it should be usually in the range of not more than 7%, it is preferred to carry out pre-drying considering the amount of adhesive solution to be used later when much water is present therein.

It has been discovered that the presence of lactose used as an oligosaccharide-containing base is a significant factor contributing to the effects obtained upon heating and this leads to favorable aroma and crispness. Similar effects can be produced in the case of maltose, sugar powders, dextrin, and oligosaccharide-containing material, such as skim milk, whey powder and the like.

The shape and size of the molding affect the difficulty or ease of ingestion, and a powdered product is not desirable because it may be inhaled. The shape which is considered favorable for newborn baby pigs to ingest is the form of pellets. The pellet may be in the form of a sphere, rod or square column, the rod and columnar forms being 2 to 4.5 mm in width and 2 to 15 mm in length, and the spherical form being 2 to 8 mm in diameter. It has been found by comparative taste tests that these are the pellets most ingested by baby pigs.

As the original object of the present invention is to provide sound growth and rearing of baby pigs by supplying iron to newborn pigs, the iron should be supplied no later than the 3rd day after birth. Baby pigs of this stage are raised only with sow's milk and do not ingest solid materials. Therefore, as a means of inducing such baby pigs to ingest iron by themselves in a positive manner, it is effective to add appropriate sweeteners or flavoring in addition to the requirements as hereinabove set forth.

As it is known that saccharin and licorice root extract can enhance flavor, they may be added in appropriate amounts as sweeteners. Although milk flavor is generally used as the flavoring, it is suitable to use a flavoring having an aroma similar to sow's milk, such as milk chocolate flavor (manufactured by Takasago Koryo K.K.). It is also possible to add milk lipids treated with an appropriate lipase to enhance the flavoring. When it is used as part of the base, whey powder itself also can play a role as a flavoring.

These sweeteners and flavorings may be molded and granulated in the manner as mentioned hereinabove in admixture with the base together with the iron salt and the organic acid or the salt thereof. In accordance with the present invention, it is also effective for improving the original nutrition to add as nutritive ingredients vitamin $B_{12}$, vitamin C and folic acid capable of accelerating the hematogenous functions, and also to add vitamin A, vitamin $D_3$, vitamin E, vitamin $B_6$ and calcium pantothenate which are the requisites for maintaining the growth and health of baby pigs.

In the management of pig breeding, it is necessary for the baby pigs to be weaned as quickly as possible and for the sow to be impregnated sooner than usual to provide increased production of baby pigs.

It is accordingly considered desirable to wean the baby pigs within 20 to 40 days after birth. In order to ensure early weaning, the baby pigs are allowed to get accustomed to ingesting feed by increasing the amount of the feed to be fed to the baby pigs in small increments from 10 to 14 days after birth. Baby pigs in the suckling period do not ingest feed in a positive manner, but start ingesting feed in the period ranging from 10 to 20 days after birth in many cases. For this reason, early weaning is difficult. The iron-containing feed products prepared in accordance with the present invention are superior in taste and overall quality for breeding baby pigs because they can accomplish not only the object of replenishing iron but provide the effect of feeding the baby pigs. The feeds in accordance with the present invention are given to a baby pig in an amount sufficient to supply a total of 0.2 to 1 g per baby pig by starting the baby pigs on the feed from the 3rd day after birth and feeding them in increments up to the 15th day after birth.

EXAMPLE 1

Comparative Taste Test Experiment (I)

A test was carried out by placing 30 g of a specimen shown in Table 1 on a rubber feeding dish (length, 23 cm; width, 12 cm; and height 2 cm; oval form; weight, 310 g). A determination as to good or poor taste was made by placing arbitrary combinations of two kinds of specimens on dishes the same place and selecting the specimen which was ingested earlier or in larger amounts. This selection was done in a tournament system. One test was made by using about 7 to 11 baby pigs from the same litter, the baby pigs being in the 2nd to 10th day after birth. Although the tests could not be carried out using baby pigs of the same age, they can be admitted as an acceptable screening procedure of specimens because the purpose is to determine the relative superiority between two specimens.

The pellets referred to herein, unless otherwise noted, were prepared with an extruder having an operational pressure of 40 kg/cm$^2$, a residence time inside the extruder of about 2 minutes, and a temperature of 100° to 102° C. The pellets were about 3 mm in diameter and about 10 mm in length.

TABLE 1

| Specimen No. | Feed | Ingestibility* |
|---|---|---|
| 1 | Powdered mixture of 25% ferrous fumarate, 5% citric acid, 1% licorice root extract plus 69% lactose | 28 g/4 days |
| 2 | Product by fluidized bed granulation of Specimen No. 1 | 23 g/4 days |
| 3 | Pellet of Specimen No. 1 | 0 g/4 days |
| 4 | Pellet of 50% ferrous fumarate, 5% citric acid, 1% licorice root extract plus 44% lactose | 7 g/4 days |
| 5 | Pellet of Specimen No. 1 without licorice root extract | 18 g/4 days |
| 6 | Pellet of 40% ferrous fumarate, 5% citric acid, 1% licorice root extract plus 54% lactose | 5 g/4 days |
| 7 | Pellet of Specimen No. 6 wherein skim milk was used in place of lactose | 7 g/4 days |
| 8 | Pellet of Specimen No. 6 wherein "Sunmalt" (manufactured by Hayashihara K.K.) was used in place of lactose | 9 g/4 days |
| 9 | Pellet of Specimen No. 6 plus 1% milk chocolate | 2 g/4 days |
| 10 | Pellet of Specimen No. 7 plus 15 milk chocolate | 0 g/4 days |
| 11 | Pellet of Specimen No. 8 plus miilk chocolate | 4 g/4 days |
| 12 | Pellet of Specimen No. 9, oblong shape, 5 mm (diameter) × 15 mm | 3 g/4 days |
| 13 | Pellet of Specimen No. 9, spherical shape, 3 mm in diameter | 4 g/4 days |
| 14 | Pellet of Specimen No. 9, irregular form, size 0.2 mm | 15 g/4 days |

*The amount of leftover feed in the feeding dish and the days during which the feeds were fed.

From the test results as shown in Table 1, the specimens in the order of quality were determined to be:

3=6=9=10=11=12=13>4=7=8>>>5=14>>2>1

EXAMPLES 2 AND 3

The compositions as shown in Table 2 below were each mixed homogeneously and molded by extruding the mixture into 60 g oblong pellets having a diameter of 3 mm and a length of 7 to 10 mm.

TABLE 2

| Composition | Example 2 | Example 3 | Comparative example |
|---|---|---|---|
| Ferrous fumarate | 15,200 mg | 20,000 mg | 15,000 mg |
| Citric acid | 2,000 mg | 3,000 mg | — |
| Licorice root extract | 300 mg | 400 mg | — |
| Flavoring | 480 mg | 480 mg | — |
| Calcium with Vitamin C added | 10,000 mg | — | — |
| Vitamin AD$_3$ | 1,000 mg | — | — |
| Vitamin B$_6$ | 100 mg | — | — |

TABLE 2-continued

| Composition | Example 2 | Example 3 | Comparative example |
|---|---|---|---|
| vitamin $B_{12}$ | 1 mg | — | — |
| Vitamin E | 300 mg | — | — |
| Calcium pantothenate | 500 mg | — | — |
| Folic acid | 30 mg | — | — |
| α-starch | 6,000 mg | 6,000 mg | — |
| Lactose | Balance | Balance | Balance |

Each of the specimens thus prepared was placed in the amount of 30 g on a rubber feeding dish and fed to baby pigs born of five sows starting on the date of birth. The amounts of the feeds ingested were measured daily at a particular time of the day thereafter.

Table 3 shows the results of Example 2 in which the composition was used having an iron content of about 8%. Table 4 shows the results of Example 3 in which the composition was used having an iron content of about 11%. Table 5 shows the results of the Comparative Example having an iron content of about 8%.

TABLE 3

| | Days | | | | | | | | |
|---|---|---|---|---|---|---|---|---|---|
| | 0-1 | 1-2 | 2-3 | 3-4 | 4-5 | 5-6 | 6-7 | 7-8 | 8-9 |
| No. 1 | 2 g | 4 g | 9 g | 5 g | 10 g | — | — | — | — |
| No. 2 | 25 g | 3 g | 1 g | 1 g | — | — | — | — | — |
| No. 3 | 8 g | 12 g | 4 g | 4 g | 2 g | — | — | — | — |
| No. 4 | 12 g | 5 g | 3 g | 2 g | 7 g | 1 g | — | — | — |
| No. 5 | 12 g | 5 g | 5 g | 8 g | — | — | — | — | — |
| Average | 11.8 g | 5.8 g | 4.4 g | 4.0 g | 3.8 g | 0.2 g | — | — | — |
| | 39.3% | 19.3% | 14.7% | 13.3% | 12.7% | 0.7% | — | — | — |

TABLE 4

| | Days | | | | | | | | |
|---|---|---|---|---|---|---|---|---|---|
| | 0-1 | 1-2 | 2-3 | 3-4 | 4-5 | 5-6 | 6-7 | 7-8 | 8-9 |
| No. 1 | 8 g | 5 g | 7 g | 3 g | 1 g | 2 g | 1 g | 3 g | — |
| No. 2 | 7 g | 4 g | 3 g | 8 g | 8 g | — | — | — | — |
| No. 3 | 9 g | 1 g | 9 g | 3 g | 2 g | 4 g | 2 g | — | — |
| No. 4 | 10 g | 3 g | 6 g | 2 g | 2 g | 5 g | 1 g | 1 g | — |
| No. 5 | 5 g | 8 g | 4 g | 6 g | 1 g | 3 g | 3 g | — | — |
| Average | 7.8 g | 4.2 g | 5.8 g | 4.4 g | 2.8 g | 2.8 g | 1.4 g | 0.8 g | |
| | 26.0% | 14.0% | 19.3% | 14.7% | 9.3% | 9.3% | 4.7% | 2.7% | |

TABLE 5

| | Days | | | | | | | | | |
|---|---|---|---|---|---|---|---|---|---|---|
| | 9-10 | 11-12 | 12-13 | 13-14 | 14-15 | 15-16 | 16-17 | 17-18 | 18-19 | 19-20 |
| No. 1 | — | — | 2 g | 5 g | 4 g | 2 g | 0 | 7 g | 7 g | 3 g |
| No. 2 | — | 1 g | 1 g | 6 g | 6 g | 4 g | 2 g | 8 g | 2 g | — |
| No. 3 | — | 2 g | 1 g | 5 g | 0 | 4 g | 8 g | 4 g | 6 g | — |
| No. 4 | 1 g | 2 g | 4 g | 2 g | 7 g | 3 g | 7 g | 4 g | — | — |
| No. 5 | — | 1 g | 3 g | 5 g | 4 g | 4 g | 2 g | 3 g | 3 g | 5 g |
| Average | 0.2 g | 1.2 g | 2.2 g | 4.6 g | 4.2 g | 3.4 g | 3.8 g | 5.2 g | 3.6 g | 1.6 g |
| | 0.7% | 4.0% | 7.3% | 15.3% | 14.0% | 11.3% | 12.7% | 17.3% | 12.0% | 5.3% |

It is apparent from the above tables that, in Examples 2 and 3, the baby pigs started ingesting the feeds immediately after birth. The tables revealed such superiority in taste that the feed of Example 2 was thoroughly ingested in 4 to 6 days and the feed of Example 3 was all ingested in 5 to 8 days. To the contrary, in the Comparative Example, the baby pigs started eating from the 10th day after birth and finished ingesting almost all of the feed by the 20th day after birth.

In the tests in which the feeds of Examples 2 and 3 and the Comparative Example were used, blood samples were collected four times from each of the baby pigs on the day of birth, and on the 2nd day, 10th day and 20th day after birth, respectively. The blood samples were measured for hemoglobin content in order to investigate the influence of the feeds on the hemoglobin in the blood as compared with the case in which no iron was supplied. The results are shown in Table 6.

TABLE 6

| | (Amounts of Hemoglobin (g/100 ml)) | | | |
|---|---|---|---|---|
| Days after Birth | 0 | 2 | 10 | 20 |
| Feed of the Invention | 12.0 g | 9.2 g | 11.8 g | 11.7 g |
| Feed of Comparative Example | 11.5 g | 9.0 g | 9.8 g | 9.7 g |
| No iron added | 11.0 g | 8.8 g | 7.2 g | 7.5 g |

As shown in Table 6 above, the feed of the present invention indicates that the amount of hemoglobin in the blood of the baby pigs apparently increased almost to the value at the time of birth, whereas the amount of hemoglobin in the blood of the baby pigs to which the feed of the Comparative Example without iron addition were fed did not return to the original value and the baby pigs remained anemic.

EXAMPLE 4

The composition of Example 2 was molded on a middle industrial scale into round rod-like pellets having a diameter of 3 mm, a length of 14 mm and a weight of about 160 mg. Tests were conducted in a building for the breeding of pigs at a farm in Tokyo, the floor of the building being covered partially with concrete and the side walls thereof being covered with wooden panels.

Baby pigs from 6 litters were used for the test. The number and the average body weights at the time of birth of the baby pigs used in the test are shown in Table 7 below.

higher on both the 10th and 20th days than for the control group. Particularly on the 20th day after birth, both the hemoglobin and hematocrit values for the control group were below the level at the time of birth, whereas the test group showed recovery in each case, even beyond the level at the time of birth.

Table 9 shows the body weights on particular days after birth, and Table 10 indicates the increase in body weights and index of the increase in body weight.

TABLE 7

| Section | Tested sow | Breed | Number of baby pigs born | Body weight at birth (average) | Date of birth |
|---------|------------|-------|--------------------------|--------------------------------|---------------|
| Test group | A | WD | −2.0~9 | 1.85 kg | July 12, 1980 |
| | B | WH | 7 | 1.49 kg | August 4, 1980 |
| | C | WL | 10 | 1.39 kg | August 11, 1980 |
| | D | WL | 11 | 1.30 kg | August 18, 1980 |
| Control group | E | WL | 8 | 1.31 kg | September 19, 1980 |
| | F | WL | 12 | 1.25 kg | September 23, 1980 |

8.10

The method of feeding involved placing test feed on a can lid disposed at a dry place in the pig-breeding building so as to allow the baby pigs to freely ingest the feed. The iron-containing pellets were placed on the can lid twice, once at the time of birth and once on the 10th day after birth in the amount of 30 g each time for the baby pigs of each litter. All the tested baby pigs completely consumed the iron-containing pellets in 5 to 6 days after feeding, whereby the superior taste of the feed of the present invention was demonstrated.

The effect on the baby pigs was determined by measuring the hemoglobin contents and hematocrit values for the baby pigs as compared with the control group in which no iron was applied.

The method of testing consisted of collecting blood samples from the right anterior main artery of the test baby pigs in the amount of 1 to 2 ml at the time of birth and on the 10th day and 20th day after birth using a syringe. Heparin calcium was employed as an anticoagulant for the collected blood. The hemoglobin content was measured by the cyanmethemoglobin method and the hematocrit value was determined by high speed centrifugation. The hemoglobin content (Hb) and the hematocrit value (Ht) are shown in Table 8 below.

TABLE 8

| | Item | | | | | |
|---|---|---|---|---|---|---|
| | Hemoglobin (Hb) (g/10 ml) | | | Hematocrit (Ht) (%) | | |
| Group | At birth | 10th day after birth | 20th day after birth | At birth | 10th day after birth | 20th day after birth |
| Test group | 9.2 ± 0.9 | 8.7 ± 0.7 | 9.4 ± 0.07 | 30 ± 2 | 28 ± 0.9 | 31 ± 0.7 |
| Control group | 10.0 ± 0.6 | 8.2 ± 0.5 | 8.5 ± 0.3 | 32 ± 1 | 26 ± 0.8 | 29 ± 0.6 |

These tests reveal that, although both the hemoglobin content and the hematocrit value at the time of birth were somewhat higher in the control group than in the test group, the figures for the test group were clearly

TABLE 9

| Group | At birth | 10th day | 20th day | 30th day |
|-------|----------|----------|----------|----------|
| Test group | 1,343 ± 30 (g) | 2,930 ± 104 (g) | 4,773 ± 195 (g) | 6,586 ± 229 (g) |
| Control group | 1,211 ± 44 (g) | 2,961 ± 130 (g) | 4,252 ± 261 (g) | 6,035 ± 303 (g) |

± Standard error

TABLE 10

| | Increase in body weight (g) | | | Index of body weight increase (g) | | |
|---|---|---|---|---|---|---|
| Group | Birth to 10th day | 10th day to 20th day | 20th day to 30th day | Birth to 10th day | 10th day to 20th day | 20th day to 30th day |
| Test group | 1,596 ± 161 | 1,843 ± 62 | 1,813 ± 278 | 114.9 | 125.3 | 101.2 |
| Control group | 1,388 ± 322 | 1,470 ± 330 | 1,790 ± 90 | 100 | 100 | 100 |

± Standard error

It is apparent from the above tables that the body weights and the increases in the body weight for the test group exceeded those for the control group and that particularly the initial increase in the body weight up to the 20th day after birth was good.

Another observation was that, in the pig-breeding farm where the tests were conducted, although about 35 days had been heretofore required for weaning baby pigs, the period of weaning could be shortened to about 25 days after birth, that is, about 10 days shorter than previously, because the baby pigs bred in the test group started ingesting the feed earlier than those in the control group.

EXAMPLE 5

Comparative tests were carried out employing test specimens having ferrous fumarate, iron sulfate or iron citrate as an iron salt. The test specimens had the following compositions:

TABLE 11

| Composition | No. 1 | No. 2 | No. 3 |
|-------------|-------|-------|-------|
| Ferrous fumarate | 15,200 mg | — | — |
| Iron sulfate | — | 23,800 mg | — |
| Iron citrate | — | — | 21,700 mg |
| (as iron) | (About 5,000 mg) | (About 5,000 mg) | (About 5,000 mg) |
| Citric acid | 2,000 mg | 2,000 mg | 2,000 mg |
| Licorice root extract | 300 mg | 300 mg | 300 mg |
| Flavoring | 480 mg | 480 mg | 480 mg |
| α-starch | 6,000 mg | 6,000 mg | 6,000 mg |

TABLE 11-continued

| Composition | No. 1 | No. 2 | No. 3 |
| --- | --- | --- | --- |
| Lactose | Balance | Balance | Balance |

Each of the compositions was extruded under high pressure to provide 60 g pellet products in round rod-like form having a diameter of about 3 mm and a length of about 7 to 10 mm. A 30 g portion of the pellets was administered to the baby pigs of one litter by placing the portion on a rubber feeding dish twice, once on the 3rd day and once on the 10th day after birth. Blood samples were collected from the right anterior main artery of each of the baby pigs on the 10th, 20th, and 30th day after birth. The blood samples were measured for their hemoglobin content. A comparative study was conducted with the control group where no iron was supplied.

TABLE 12

| Group | Number of Baby pigs | Hemogrobin content (Average, g/100 ml) | | |
| --- | --- | --- | --- | --- |
| | | 10th day | 20th day | 30th day |
| Group of composition No. 1 | 11 | 10.8 | 10.5 | 11.1 |
| Group of composition No. 2 | 8 | 9.7 | 9.8 | 10.1 |
| Group of composition No. 3 | 9 | 10.2 | 10.2 | 10.5 |
| Control group of no iron addition | 7 | 7.2 | 7.5 | 8.3 |

As shown in Table 12, it has been found that the hemoglobin contents were higher in the group where iron was administered as compared with the control group of no iron addition.

EXAMPLE 6

Comparative tests were carried out to determine the influence of an organic acid upon the taste of an iron salt, the organic acid being in crystalline form at room temperature. No addition of such organic acid was used as a control. The components of feeds tested are shown in the table below.

TABLE 13

| Composition | No. 1 | No. 2 | No. 3 | No. 4 |
| --- | --- | --- | --- | --- |
| Citric acid | 2,000 mg | — | — | — |
| Succinic acid | — | 2,000 mg | — | — |
| Malic acid | — | — | 2,000 mg | — |
| Ferrous fumarate | 15,200 mg | 15,200 mg | 15,200 mg | 15,200 mg |
| Licorice root extract | 300 mg | 300 mg | 300 mg | 300 mg |
| Flavoring | 480 mg | 480 mg | 480 mg | 480 mg |
| α-starch | 6,000 mg | 6,000 mg | 6,000 mg | 6,000 mg |
| Lactose | Balance | Balance | Balance | Balance |

The components were extruded under high pressure to produce 60 g pellet products in round rod-like form having a diameter of about 3 mm and a length of about 7 to 10 mm. A 30 g portion of the pellets was administered to baby pigs of one litter by placing the portion on a rubber feeding dish on the 3rd day after birth. A determination as to whether the taste was good or poor was made on the basis of the number of days required for the complete ingestion of the feed. The results are shown in the table below.

TABLE 14

| Group | Number of baby pigs | 3rd day | 4th day | 5th day | 6th day | 7th day | 8th day | 9th day | 10th day | 11th day | 12th day |
| --- | --- | --- | --- | --- | --- | --- | --- | --- | --- | --- | --- |
| No. 1 | 8 | 6 g | 11 g | 3 g | 5 g | 5 g | — | — | — | — | — |
| No. 2 | 10 | 3 g | 5 g | 4 g | 5 g | 6 g | 3 g | 4 g | — | — | — |
| No. 3 | 8 | 9 g | 1 g | 6 g | 6 g | 3 g | 5 g | — | — | — | — |
| No. 4 | 11 | 1 g | — | — | 2 g | — | 1 g | — | 1 g | 3 g | — |

Comparative taste tests using the different organic acids as shown in Table 14 above revealed that the feeds containing citric acid, succinic acid or malic acid fed to the baby pigs on the 3rd day after birth were completely consumed in 5 to 7 days after feeding, while the feed compounded with citric acid was ingested earliest in 5 days after feeding. The feed No. 4 containing no organic acid was ingested by the baby pigs merely in the amount of 8 g in 10 days after feeding.

This leads to the conclusion that the iron salt compounded with the organic acid has a remarkably improved taste as compared with a feed involving no addition of any organic acid, although a variation can be anticipated more or less depending on the kind of organic acids.

EXAMPLE 7

Comparative taste tests were carried out with respect to bases selected from dextrin, whey powder and lactose. Each of the components of the test products are shown in the table below, and the test products were prepared by extruding the compositions under high pressure into 60 g of round rod-like pellets having a diameter of about 3 mm and a length of about 7 to 10 mm.

TABLE 15

| Composition | No. 1 | No. 2 | No. 3 |
| --- | --- | --- | --- |
| Ferrous fumarate | 15,200 mg | 15,200 mg | 15,200 mg |
| Citric acid | 2,000 mg | 2,000 mg | 2,000 mg |
| Licorice root extract | 300 mg | 300 mg | 300 mg |
| Flavoring | 480 mg | 480 mg | 480 mg |
| α-starch | 6,000 mg | 6,000 mg | 6,000 mg |
| Lactose | Balance | — | — |
| Dextrin | — | Balance | — |
| Whey powder | — | — | Balance |

A 30 g portion of the feed product thus prepared was administered to baby pigs born of one litter on the 3rd day after birth by placing the portion on a rubber feeding dish. The taste was determined according to the number of days required for complete ingestion after feeding.

TABLE 16

| Group | Number of baby pigs | 3rd day | 4th day | 5th day | 6th day | 7th day | 8th day | 9th day | 10th day | 11th day | 12th day |
|---|---|---|---|---|---|---|---|---|---|---|---|
| No. 1 | 7 | 11 g | 3 g | 8 g | 4 g | 4 g | | | | | |
| No. 2 | 7 | 9 g | 7 g | 7 g | 2 g | 5 g | | | | | |
| No. 3 | 9 | 15 g | 4 g | 6 g | 5 g | | | | | | |

As shown by the test results in Table 16 above, each of the feeds containing lactose, dextrin or whey powder as the base was eaten up in about 4 to 5 days after feeding, showing a similar effect in taste for each case.

As has been described in detail, the feeds, the feed additives and the veterinary drugs for baby pigs in accordance with the present invention possess the remarkable effects of replenishing iron because of the superior flavor of the feed for the baby pigs, effecting the prevention and cure anemia in baby pigs, and improving the breeding rate of baby pigs to a remarkable extent.

What is claimed is:

1. A process for preparing a feed for baby pigs, which comprises:
    (a) preparing a mixture of an edible iron salt selected from at least one member of the group consisting of ferrous fumarate, iron citrate, iron DL-threonine, sodium iron citrate succinate, and iron sulfate, in an amount corresponding to 3.2 to 16.4% by weight as iron; an additional edible organic acid selected from at least one member of the group consisting of citric acid, succinic acid, gluconic acid, malic acid and fumaric acid or a salt thereof in an amount of 1 to 10% by weight, which is in solid form at room temperature; small amounts of a sweetener, a flavoring and, if desired, vitamins: and an oligosaccharide-containing base as the balance of the mixture;
    (b) shaping the mixture into pellets having desired shapes; and
    (c) heating the mixture at a temperature of at least 70° C. to produce a product having a water content of not more than 7%.

2. A process according to claim 1, wherein the mixture is molded into square rod-like pellets having a length of 2 to 15 mm and a depth and a width of 2.0 to 4.5 mm.

3. A process according of claim 1, wherein the mixture is molded into round rod-like pellets having a length of 2 to 15 mm and a diameter of 2.0 to 4.5 mm.

4. A process according to claim 2 or 3, wherein the molding is effected in step (c) by means of extruding said mixture under high pressure.

5. A process according to claim 4, wherein the pressure is in the range of 20 to 70 kg/cm².

6. A process according to claim 1, wherein the shaping is effected after heating by spraying the mixture with an adhesive and causing the particles of the mixture to coagulate through self granulation.

7. A feed for baby pigs comprising at least one source of edible iron salt selected from at least one member of the group consisting of ferrous fumarate, iron citrate, iron DL-threonine, sodium iron citrate succinate, and iron sulfate, in an amount corresponding to 3.2 to 16.4% by weight as iron; at least one additional source of edible organic acid selected from at least one member of the group consisting of citric acid, succinic acid gluconic acid, malic acid and fumaric acid or a salt thereof in an amount of 1 to 10% by weight, which is in solid form at room temperature; small amounts of a sweetener, a flavoring agent and, it desired, vitamins; and an oligasaccharide-containing base material as the balance of the feed and being in the form of pellets, produced in accordance with the process of claim 1.

8. A feed according to claim 7, wherein the pellet has a square rod-like shape having a length of 2 to 15 mm and a width and depth of 2.0 to 4.5 mm.

9. A feed according to claim 7, wherein the pellet has a round rod-like form having a length of 2 to 15 mm and a diameter of 2.0 to 4.5 mm.

10. A feed according to claim 7, wherein the feed has a water content of not more than 7%.

11. A feed according to claim 7, wherein the oligosaccharide-containing base material is at least one member selected from the group consisting of lactose, maltose, skim milk, sugar powder, and whey powder.

12. A method of feeding baby pigs which comprises administering a feed in increments equivalent to a total of 0.2 to 1 g of iron per baby pig during the 3rd and 15th days after birth, said feed comprising at least one source of edible iron salt selected from at least one member of the group consisting of ferrous fumarate, iron citrate, iron DL-threonine, sodium iron citrate succinate, and iron sulfate in an amount corresponding to 3.2 to 16.4% by weight as iron; at least one additional source of edible organic acid or a salt thereof selected from at least one member of the group consisting of citric acid, succinic acid, gluconic acid, malic acid and fumaric acid in an amount of 1 to 10% by weight, which is in solid form at room temperature; small amounts of a sweetener, a flavoring agent and, if desired, vitamins; and an oligosaccharide-containing base as the balance of the feed, said feed being in the form of pellets produced in accordance with the process of claim 1.

* * * * *